United States Patent Office 2,832,751
Patented Apr. 29, 1958

2,832,751

POLYVINYL CHLORIDE STABILIZED WITH BUTYL TIN S,S',S" TRIS (MERCAPTO-ACETIC ACID)

Elliott L. Weinberg, Long Island City, N. Y., and Ernest W. Johnson, Westfield, N. J., assignors to Metal & Thermit Corporation, New York, N. Y., a corporation of New Jersey No Drawing. Original application May 5, 1952, Serial No. 286,196. Divided and this application June 17, 1953, Serial No. 370,877

1 Claim. (Cl. 260—45.75)

The present application is a division of our copending application Serial Number 286,196, filed May 5, 1952 and a continuation in part of copending application Serial No. 232,878, filed June 21, 1951, now Patent Number 2,648,650, granted August 11, 1953, and relates to an invention pertaining to novel organo-tin derivatives of mercapto compounds and to resin compositions containing these compounds as a stabilizer.

In the aforesaid copending application, there is described and claimed broadly a new group of compounds generally designated as condensation products of certain organotin compounds with mercapto acids and esters. More particularly these compounds may be illustrated by the following structural formulas:

$R_3SnSR'COOR''$
$R_2Sn(SR'COOR'')_2$ and
$RSn(SR'COOR'')_3$ wherein R is a univalent organic radical such as an alkyl, aryl, aralkyl or alkaryl, R" represents hydrogen or a univalent organic radical such as alkyl, aryl, aralkyl or alkaryl, and R' is a divalent organic radical selected from the class consisting of substituted or unsubstituted alkylene, arylene, aralkylene or alkarylene. It is to be noted that the tin radical is bonded to the sulfur radical.

The organo-tin derivatives referred to are far superior stabilizers for resins, particularly vinyl halide resins, to any known stabilizer in quantities as low as one half of one percent of the weight of the resin. This superior stabilizing property is equally applicable to resin-plasticizer compositions, inclusive of the phosphate type plasticizers, the use of which has heretofore been prohibitive due to their instability even in the presence of known stabilizers. However, the mercapto acid ester derivatives and the like of organo-tin compounds impart stabilization to the phosphate plasticizer resin systems, permitting thereby the production of superior fireproof plastic compositions.

These compounds may be prepared in any suitable manner. It has been found however that these novel products may be prepared in high yield and purity by reacting an organo-tin compound with mercapto-acids and mercapto-acid esters, and recovering a reaction product having the desired Sn—S linkage and ratio. More specifically, an organo-tin compound selected from the group consisting of organo-tin hydroxide, oxide, and stannoic acid may be condensed with an appropriate amount of a mercapto acid or mercapto acid ester to produce products having the above structural formulas. An organo-tin halide having the formula $RSnX_3$, $R_2SnX_2$, or $R_3SnX$ wherein X is a halide, such as chlorine, may also be employed as the reactant with the mercapto acids or esters. However, for optimum results, it is preferable to conduct these reactions in the presence of basic substances or alkaline neutralizing agents (hydrogen ion acceptors) such as oxides, hydroxides (e. g. sodium hydroxide) carbonates (e. g. sodium and potassium carbonate), and tertiary amines (e. g. sodium and potassium carbonate), and tertiary amines (e. g. pyridine), etc. These substances accept the hydrogen ion formed during the condensation reaction and are not deleterious to the mercapto acid or ester when used in the prescribed manner. Basic substances of the character of ammonia, primary and secondary amines, should not be employed ordinarily, because they tend to react with esters, and thereby decrease the yield of desired ester products.

The reaction mechanism for the formation of the bismercapto derivatives using organo-tin oxide is clearly illustrated by the following equation:

$R_2SnO + 2HSR'COOR'' = R_2Sn(SR'COOR'')_2 + H_2O$

This equation graphically shows that the reaction occurs between the mercapto radical and the organo-tin oxide, whereby water splits off and a chemical bond is formed between the tin and the sulfur. It further illustrates the necessity of two molecules of the mercapto compound per mole of tin containing reactant in order to obtain the desired reaction and the desired end product having a 2:1 ratio of sulfur to tin.

Similarly, products of the formula $RSn(SR'COOR'')_3$ require a 3:1 ratio of sulfur to tin. Using stannoic acid as a reactant, the reaction may be illustrated as follows:

$RSnOOH + 3HSR'COOR'' = RSn(SR'COOR'')_3 + 2H_2O$

Products of the formula $R_3SnSR'COOR''$ require a 1:1 sulfur to tin ratio. Thus using organo tin chloride as a reactant, the reaction may be graphically represented as follows:

$R_3SnCl + HSR'COOR'' = R_3SnSR'COOR'' + HCl$

It is within the scope of this invention that pure, impure or commercial grades of the reactants may be employed satisfactorily. In general, pure compounds of the above formulas may be prepared from pure raw materials. However, these novel compounds may be diluted with innocuous, inert materials, thereby permitting the use of technical materials or intermediates in their preparation.

Any suitable reaction temperatures may be employed. It is ordinarily preferred to use room or slightly elevated temperatures of the order of up to about 50° C. The exothermic nature of the reaction between the organo-tin reactants and alpha or beta mercapto-acid esters and the like, affords a considerable saving in the expenditure for external heat. This reaction may be conducted at room temperature with a concomitant rise of about 5 to 10 degrees after the reaction has started. Thus, for example, the initial reaction temperature may be within the broad range of 19° C–28° C, and the final reaction temperature may be within the ranges of 24° C–40° C. However, the presence of the water produced by the condensation reaction usually requires an additional heating or refluxing in order to strip said water from the reaction product, though it may be removed in any suitable manner.

The use of inert organic solvents as the medium for the reaction, such as toluene, benzene, methyl alcohol, etc. is contemplated. The presence of such solvent facilitates the desired reaction. The solvent may be eliminated from the reaction product at the completion of the reaction by any suitable means. This may be accomplished by vaporizing the solvent under vacuum at elevated temperatures. Pressures of about 2 to 30 mm. and temperatures of 75°–160° C. are satisfactory in effecting removal of toluene or like solvent, from the reaction product.

By the procedures of this invention, these novel organo-tin derivatives of mercapto-acids and mercapto-acid esters can be obtained in almost theoretical yields. These yields are indicative of the non-necessity of the use of an excess of either reactant, the total amount of starting materials being substantially completely utilized in the formation of the final reaction product.

The following examples are further illustrative of these novel products and their preparation, and it will be understood that the invention is not limited thereto.

EXAMPLE I

Mercaptoacetic acid, 97% (194 gms.) 3,5,5 trimethyl hexyl alcohol (288 gms.), paratoluene-sulphonic acid, (2 gms.) (esterification catalyst) and 100 ml. of toluene were placed in a glass reaction vessel provided with a Barrett moisture trap, glass agitator and immersion thermometer. The mixture was refluxed with stirring to remove water of reaction. In 6 hours, theoretical water was extracted. The final pot temperature was 160° C. The toluene was then stripped in vacuo at 10 mm. pressure; the trimethyl hexyl mercaptoacetate was distilled at 125° C. at 10 mm. Sulfur content as calculated was 14.68% and as actually found was 14.68%.

The trimethyl hexyl mercaptoacetate (333 gms.) was added to a stirred slurry of 189 gms. dibutyltin oxide in 350 cc. of toluene. An exothermic reaction in which the temperature rose from 28° to 38.5° C. ensued. The slurry became slightly turbid in contrast with the initial opaque appearance. The temperature was then raised to toluene reflux. Using a moisture trap, water (11.8 gms.) was removed from the product. Toluene was removed by vacuum distillation. The dibutyltin S, S,' bis (3,5,5 trimethylhexyl mercaptoacetate) was a slightly viscous colorless liquid (98% yield). The calculated analysis would be Sn, 17.76% and S, 9.62%. Analysis showed Sn, 17.41% and S, 9.36%.

EXAMPLE II

Cyclohexanol (150 gms.) mercaptoacetic acid (97%—146 gms.) and 50 ml. of toluene were placed in a reaction flask, fitted with a Barrett moisture trap and reflux condenser. The theoretical amount of water (32 cc.) was separated in 1½ hours. The final pot temperature was 160° C. The resulting cyclohexyl mercaptoacetate distilled at 105–10° C. at 10 mm. pressure. Sulfur content calculated 18.40%; found 18.11%.

The cyclohexyl mercaptoacetate (179 gms.) was added to 126 gms. of dibutyltin oxide slurried in 240 cc. of toluene. An exothermic reaction ensued—the temperature rising from 30° to 40° C. and, at the same time, the mixture became clearer. The mixture was then heated to remove water of reaction via a Barrett moisture trap (8.8 cc. were separated). The final pot temperature was 119° C. The toluene was then stripped at 18 mm. pressure; the final pot temperature was 135° C. The dibutyltin S,S' bis (cyclohexyl mercaptoacetate) was a slightly yellow liquid which had the following analyses: Sn=19.91%; S=10.80%. A calculated composition calls for Sn=20.30%; S=10.93%.

EXAMPLE III

Phenoxyethanol (276.4 gms. Dowanol 1), mercaptoacetic acid, 97% (200 gm.) and 100 ml. of toluene were refluxed and the theoretical amount of water was removed in 3 hours. The toluene and excess mercaptoacetic acid were stripped by heating to 100° C. at 10 mm. Sulfur content found 12.77%; calculated 15.10%.

The phenoxyethyl mercaptoacetate (167 gms.) was added to 83 gms. of dibutyltin oxide slurried in 260 cc. of toluene. Temperature rise from 23° to 28° C. was noted. 5.1 cc. of water were removed in one hour. After the solution was clarified by filtration, the toluene was stripped to a pot temperature of 125° C. at 9 mm. pressure. The dibutyltin S, S' bis (phenoxyethyl mercaptoacetate) was a light colored liquid. It analyzed 14.10% Sn and 9.51% S. Calculated Sn and S contents are 16.23% and 8.73% respectively. Due to the technical nature of Dowanol 1, the ester and reaction product are contaminated with inert diluents.

EXAMPLE IV

Dihydroabietyl mercaptoacetate was prepared by refluxing a toluene solution of ½ mole of "Abitol" (85% hydroabietyl alcohols, 166 gms.) with ½ mole of mercaptoacetic acid (48 gms.). About 9 cc. of water were removed at the time the esterification was stopped. No catalyst was used.

To this toluene solution of the hydroabietyl mercaptoacetate was added dibutyltin oxide (62.5 gms.—¼ mole). The exothermic reaction which resulted caused the temperature to rise from 22° C. to 28° C. An hour of refluxing removed the water of reaction (4.5 cc.). The solution was filtered and the toluene was stripped in vacuo. The dibutyltin S, S' bis (dihydroabietyl mercaptoacetate) analyzed 11.05% Sn, 5.68% S.

EXAMPLE V

Trimethyl nonyl mercaptoacetate was prepared by placing 1 mole, 95 gms., of 97% mercaptoacetic acid and 1 mole, 186 gms., of commercial trimethyl nonyl alcohol with 100 ml. of toluene and boiling chips in a reaction flask. No esterification catalyst was used. The theoretical amount of water was over in about 14 hours. This solution of the ester was then reacted with 124.5 gms., ½ mole, of dibutyltin oxide. An exothermic reaction ensued in which the temperature rose from 22° C. to 31.5° C. 7.8 cc. of water was removed in two hours of refluxing. This toluene solution was filtered by gravity. The toluene was stripped from the batch at 25 mm. pressure to a pot temperature of 80° C. The pressure was then reduced to 8 mm. and the pot temperature was raised to 120° C. The residue, dibutyltin S,S' bis (trimethyl-nonyl mercaptoacetate), was a cloudy yellow viscous liquid, analysis of which was 12.5% Sn and 7.7% S. Various diluent impurities are present in the product due to the commercial nature of the reactants.

EXAMPLE VI

Diethylene glycol laurate mercaptoacetate was prepared from commercial diethylene glycol monolaurate. An estimated 1 mole of this latter material, 288 gms., was reacted with 95 gms. of mercaptoacetic acid (97%) in the presence of 50 ml. of toluene. The reaction was completed in 5 hours. This toluene solution was further reacted by adding 124.5 gms. of dibutyltin oxide to it. There was an exothermic reaction in which the temperature rose from 23° C. to 29° C. The reaction was completed in about 2½ hours wherein 7 cc. of water were removed. The toluene solution was filtered hot by gravity. The clear solution was then stripped to a final pot temperature of 100° C. at 10 mm. pressure. The resulting product, dibutyltin S,S' bis (diethylene glycol laurate mercaptoacetate) analyzed 9.4% Sn and 5.6% S.

EXAMPLE VII

Ethylene glycol ricinoleate mercaptoacetate was prepared in a manner similar to that used in Example VI. Since the ethylene glycol ricinoleate was a commercial product, the resulting materials were not of a very high purity. The ester so prepared was reacted by adding it to the toluene suspension of the dibutyltin oxide, ¼ mole, 62.5 gms. An exothermic reaction resulted in which the temperature rose from 23° C. to about 30° C. The theoretical water was removed in about one hour. The solution was filtered and the toluene was stripped. The resulting material was a thick tan liquid in which considerable precipitation resulted. The material analyzed 5.8% Sn and 3.8% S.

EXAMPLE XVII

The process of Example XIV was repeated using one mole of alpha bromovaleric acid in place of alpha chloropropionic acid. Dibutyltin S,S' bis(trimethylhexyl alpha mercaptovalerate) resulted.

EXAMPLE XVIII

Alpha bromocaproic acid was prepared by the Hell-Vollhardt-Zelinsky bromination of 2 moles of caproic acid.

One mole of the $\alpha$-bromocaproic acid was used in the process of Example XVI to yield ultimately dibutyltin S,S' bis(trimethylhexyl $\alpha$-mercaptocaproate).

EXAMPLE XIX

Two moles of caprylic acid were brominated by the Hell-Vollhardt-Zelinsky method to yield $\alpha$-bromocaprylic acid.

One mole of the resulting $\alpha$-bromocaprylic acid was used in the process of Example XVI, with the use of butyl alcohol in place of the 3,5,5 trimethylhexanol, to yield dibutyltin S,S' bis(butyl $\alpha$-mercaptocaprylate).

EXAMPLE XX

Ethyl $\alpha$-mercapto-$\alpha$-ethylcaproate was prepared by treating one mole of the ethyl $\alpha$-bromo-$\alpha$-ethylcaproate with two moles of 70% sodium sulfhydrate in 200 ml. of butyl alcohol saturated with hydrogen sulfide for 4–8 hours at reflux. The resulting ethyl $\alpha$-mercapto-$\alpha$-ethylcaproate was treated with its equivalent of dibutyltin oxide in refluxing toluene to yield, after removal of water and solvent, dibutyltin S,S' bis(ethyl $\alpha$-mercapto-$\alpha$-ethylcaproate).

EXAMPLE XXI

Capric acid (one mole) was treated by refluxing for one hour in thionyl chloride (200 ml.). To the resulting solution was then added 1.05 moles of bromine over a period of 2–3 hours. The mixture was allowed to stand overnight, the excess bromine and thionyl chloride removed by vacuum stripping. The residue was added to water to effect hydrolysis of the $\alpha$-bromocapryl chloride. This is a modification of the process of Schwenk and Papa, J. Am. Chem. Soc. 70, 3627 (1948). The alpha-bromo-capric acid was recovered and treated by the process of Example XIV to yield dibutyltin S,S' bis(butyl $\alpha$-mercaptocaproate).

EXAMPLE XXII

One mole of pelargonic acid was treated by the process of Schwenk and Papa (J. Am. Chem. Soc. 70, 3627 (1948)) to yield ethyl $\alpha$-bromopelargonate.

Using the process of Example XVI the ethyl $\alpha$-bromopelargonate was converted ultimately to dibutyltin S,S' bis(butyl $\alpha$-mercaptopelargonate).

EXAMPLE XXIII

Lauric acid was treated by the process of Example XXI to yield dibutyltin S,S' bis(butyl $\alpha$-mercaptolaurate).

EXAMPLE XXIV

One mole of palmitic acid was brominated by the standard Hell-Vollhardt-Zelinsky method. The $\alpha$ bromopalmitic acid was treated by the method of Example XVI to yield dibutyltin S,S' bis(butyl $\alpha$ mercaptopalmitate).

EXAMPLE XXV

Two moles of stearic acid was treated by the method of Example XXII to yield dibutyltin S,S' bis(butyl $\alpha$ mercaptostearate).

EXAMPLE XXVI

Two moles of phenylacetic acid were treated by the method of Example XXII to yield ethyl $\alpha$ bromophenylacetate. The ethyl $\alpha$ bromophenylacetate was treated with 2-mole equivalents of sodium sulfhydrate in 600 ml. of water to yield ethyl $\alpha$ mercaptophenylacetate. This in turn was treated with dibutyltin oxide in boiling toluene to yield dibutyltin S,S' bis(ethyl $\alpha$ mercaptophenylacetate).

EXAMPLE XXVII

One mole of diphenylacetic acid was treated by the process of Example XXVI. The intermediate ethyl $\alpha$ bromodiphenylacetate was a bluish green liquid which slowly became yellowish in color after standing. Dibutyltin S,S' bis(ethyl $\alpha$ mercaptodiphenylacetate) was the product obtained.

EXAMPLE XXVIII

Diethylacetic acid (2 moles) was treated by the process of Example XXII to yield dibutyltin S,S' bis(trimethylhexyl $\alpha$ mercaptodiethylacetate).

EXAMPLE XXIX

Water (1000 grams), 1,3 dibromopropane (2.50 moles, 502 grams) and phenol (2 moles, 188 grams) were stirred and heated to reflux and a solution of sodium hydroxide (1.9 moles, 76 grams) in 250 ml. of water was added slowly over a period of two hours. The mixture was then refluxed for 8 hours. The lower layer was separated, washed with a solution of sodium hydroxide, then with water, and dried over anhydrous sodium sulfate. It was then vacuum distilled to yield 3 phenoxypropyl bromide. This is a modification of a process given in J. Am. Chem. Soc. 71, 3163 (1949).

The 3-phenoxypropyl bromide was then added to an equivalent quantity of sodiomalonic ester in refluxing absolute alcohol sufficient to keep the sodiomalonic ester in solution. The sodiomalonic ester was prepared by dissolving an equivalent quantity of sodium in absolute ethanol (dried by the use of magnesium methoxide) and adding ethyl malonate to the sodium ethoxide solution. Both these reactions were carried out with suitable stirring. After the phenoxypropyl bromide had been added, refluxing and stirring were continued for two to three hours. The solution was filtered, and the filtrate was distilled to remove ethanol and finally vacuum distilled to recover the diethyl 3-phenoxypropylmalonate.

The diethyl 3-phenoxypropylmalonate was refluxed with hydrobromic acid (200 ml. of 48% HBr per mole of ester) in such a way as to remove the ethyl alcohol and ethyl bromide formed. More hydrobromic acid was added as necessary. An exit tube from the top of the reflux condenser dipped under the surface of water in a small container served to indicate the rate at which carbon dioxide was evolved from decarboxylation of the substituted malonic acid.

The 5-bromovaleric acid formed in this reaction was separated by dissolving in sodium bicarbonate solution, extracting with ether to remove phenol, acidifying the solution and finally extracting with ether. The ether solution was distilled to remove ether and the residue vacuum distilled to recover 5-bromovaleric acid.

Thiourea (2 mole equivalents) and the 5-bromovaleric acid were refluxed with sufficient water to dissolve the thiourea (about 100 ml./2 moles of thiourea) for 2 to 3 hours. Sodium hydroxide (5 moles/mole of 5-bromovaleric acid in 300 ml. of water) was then added and the solution refluxed for 20 hours. Acidification, ether extraction, and distillation of the ether extract yielded 5-mercaptovaleric acid.

Repeating the process in Part B of Example XIV using the 5-mercaptovaleric acid yielded dibutyltin S,S' bis(trimethylhexyl 5-mercaptovalerate).

EXAMPLE XXX

The process of Example XXIX repeated where the 1,3 dibromopropane was replaced by 1,4 dibromobutane yielded dibutyltin S,S' bis(trimethylhexyl 6-mercaptocaproate).

EXAMPLE VIII 2-butyloctanol-1, 176 gms, and beta mercaptopropionic acid, 100 gms., and 100 cc. of toluene were placed in a reaction flask and refluxed until 16 cc. of water were removed. This esterification proceeded at a somewhat slower rate than the mercapto-acetic acid esterification. The toluene was stripped from this ester. The ester analyzed 10.6% S. The ester, 150 gms., was dissolved in 200 cc. of toluene. 62.5 gms. of dibutyltin oxide were added to the toluene solution and the temperature rose from 19° to 24° C. Toluene was refluxed to remove water and 4.5 cc. were taken off in 3 hours. The toluene solution was filtered. The toluene was stripped from the solution at a pressure of 9 mm. to a pot temperature of 125°. The dibutyltin S,S' bis (2-butyloctyl beta mercaptopropionate) was a viscous slightly yellow liquid. It analyzed 14.2% Sn, 7.5% S. Calculated analyses, 14.0% Sn, 8.3% S.

EXAMPLE IX

Butyl mercaptoacetate was prepared by refluxing mercaptoacetic acid, 97% (95 gms.) with butyl alcohol (148 gms.) in the presence of paratoluene-sulfonic acid and removing water by means of a moisture trap. The excess alcohol was removed by vacuum distillation. The ester was distilled at 80° C. at 20 mm. pressure. Sulfur content: found 21.04; calculated 21.6%. 37 gms. of the butyl mercaptoacetate was mixed with 59.1 gms. of dilauryltin oxide using 100 ml. of toluene as the solvent. This slurry was refluxed until 2¼ ml. of water were removed. The toluene solution was filtered. The toluene was stripped to a pot temperature of 130° C. at 2½ mm. A yellow liquid was obtained weighing 87.1 gms. The dilauryltin S,S' bis (butyl mercaptoacetate) analyzed 15.2% Sn, 8.7% S. Calculated analyses 15.8% Sn, 8.5% S.

EXAMPLE X

Mixed decyl mercaptoacetate was prepared by reacting 1215 gms. of mercaptoacetic acid with 2000 gms. of mixed decanola (product of Carbide and Carbon Chemicals Corp.) in the presence of 12 gms. of para toluenesulphonic acid. In four hours 240 mls. of water were removed. The toluene was stripped in vacuo and the mixed decyl mercaptoacetates distilled at about 130° C. at 10 mm. pressure. The decyl mercaptoacetate, 62.5 gms., 81.3 gms. tributyltin monochloride, and 100 ml. of toluene were charged into a flask. To this flask was added gradually sodium carbonate, 26.5 gms., 100% in excess of the amount required. On adding the sodium carbonate, the temperature rose from 22° C. to 28° C. After addition, the mixture had a pink coloration. Heat was then applied. The reaction was completed in six hours as evidenced by the removal of water and carbon dioxide from the reaction. The salt residue was filtered and this material was stripped of toluene via vacuum distillation to a pot temperature of 125° C. at 2 mm. pressure. The product was a yellow colored liquid which weighed 107 grams. The tributyltin S decyl mercaptoacetate analyzed 21.3% Sn, 6.7% S. Theoretical analysis for such a material is 22.8% Sn, 6.2% S.

EXAMPLE XI

Decyl mercaptoacetate, 35.8 gms. of a 93% purity, was admixed with butyl stannoic acid, 9.8 gms. and 50 ml. of toluene. The mixture was heated with stirring and water was removed as it was formed. The reaction was completed in 2½ hours. The solution was filtered by gravity and the toluene was stripped in vacuo to a pot temperature of 140° C. at 2 mm. The product was a light yellow liquid weighing 36.7 gms. The product analyzed 13.25% Sn, 11.1% S. The theoretical analysis for this product which is butyltin S,S',S'' tris (decyl mercaptoacetate) is 13.7% Sn, 11.0% S.

EXAMPLE XII

Decyl mercaptoacetate, 14.7 gms. of a 93% purity, was admixed with triphenyltin chloride, 22.7 gms., and 55 ml. of toluene. To this mixture was added slowly sodium carbonate, 10.6 gms. The addition of the carbonate and removal of water of reaction were completed in 3⅓ hours. The material was then filtered by gravity and the toluene was stripped in vacuo to a pot temperature of 130° C. at 2 mm. pressure. The product was a light colored viscous liquid. It analyzed 19.4% Sn, 6.1% S. The theoretical analysis for this triphenyltin S decyl mercaptoacetate is 20.5% Sn, 5.5% S.

EXAMPLE XIII

Thiomalic acid (87.0 gms.—0.50 mole) was dissolved in methyl alcohol (300 ml.). The solution was stirred while dibutyltin oxide (62.5 gms.—0.25 mole) was added. The oxide dissolved. The reaction was completed by distilling off the methyl alcohol and water of reaction in vacuo at a pot temperature of 105° C. and then placing the reaction product on a steam bath in an evaporating dish. The product, dibutyltin S,S' bis (thiomalic acid) was a grey, low-melting solid which analyzed 18.9% Sn, 11.3% S.

EXAMPLE XIV

Part A

Three moles (325.5 grams) of alpha chloropropionic acid were added dropwise to a solution of sodium sulfhydrate (6 moles, 480 grams of 70% sodium sulfhydrate and 250 ml. of water) saturated with hydrogen sulfide. The mixture was stirred and hydrogen sulfide was passed into the solution during the addition. After the acid had been added the solution was heated to reflux for 3½ hours.

The solution was then cooled and an excess of hydrochloric acid was added. The solution was heated for three hours to effect complete reaction. It was then cooled and extracted with ether.

The ether extract was evaporated until free of ether and the residue distilled to recover the mercaptoacid. Yield was 90 grams of a clear liquid.

Part B

Two moles of 3,5,5 trimethylhexanol, the 90 grams of alpha mercaptopropionic acid, 100 ml. of toluene and 2 ml. of 47% boron trifluoride etherate were refluxed until the water of esterification had been removed. To the resulting ester, 0.42 mole (104.5 grams) of dibutyltin oxide was added, the mixture refluxed to effect solution of the oxide and removal of water of reaction. The final mixture was stripped under vacuum to leave as a residue dibutyltin S,S' bis(trimethylhexyl α-mercaptopropionate).

EXAMPLE XV

The process of Example XIV was repeated using 1 mole of β-bromobutyric acid in place of the α-chlorobutyric acid. The other ingredients were used in equivalent amounts. The resulting product is dibutyltin S,S' bis (trimethylhexyl β-mercaptobutyrate).

EXAMPLE XVI

Three moles of α-bromobutyric acid and 3.15 moles of thiourea were heated in 500 ml. of alcohol to form 5-ethylpseudothiohydantoin hydrobromide. The pseudothiohydantoin was isolated by evaporation of the alcohol and hydrolyzed by boiling sodium hydroxide solution in alcohol. This method is reported in J. Am. Chem. Soc. 49, 2064 (1927). The resulting solution was acidified and extracted with ether. The ether solution was evaporated; the residue distilled to isolate the α-mercaptobutyric acid.

Subsequent treatment was the same as in Example XIV, Part B, to yield dibutyltin S,S' bis(trimethylhexyl alpha mercaptobutyrate).

EXAMPLE XXXI

Pentamethylene dibromide used in the process of Example XXIX yielded dibutyltin S,S' bis(trimethylhexyl 7-mercaptohexanoate).

EXAMPLE XXXII

Hexamethylene dibromide used in the process of Example XXIX (with the substitution of butyl alcohol for 3,5,5 trimethylhexanol) yielded dibutyltin S,S' bis(butyl 8-mercaptocaprylate).

EXAMPLE XXXIII

Decamethylene dibromide used in the process of Example XXIX, with the further substitution of butanol for the trimethylhexanol yielded dibutyltin S,S' bis(butyl 12-mercaptolaurate).

EXAMPLE XXXIV

Triethyl tin chloride (0.1 mole), decyl mercaptoacetate (0.1 mole) and toluene (100 ml.) were admixed. Sodium carbonate (0.05 mole) powder, anhydrous, was added gradually to the stirred solution. Carbon dioxide was evolved. Water of reaction was removed by refluxing with a moisture trap. The solution was filtered to remove sodium chloride. The toluene was stripped in vacuo. The pot residue, a liquid, was triethyl tin S (decyl mercaptoacetate). The material analyzed 25.43% Sn and 6.32% S.

EXAMPLE XXXV

Tributyl tin hydroxide (0.1 mole), mercaptoacetic acid (0.1 mole) and toluene (100 ml.) were admixed. Water of reaction was removed by refluxing with a moisture trap. The toluene was stripped in vacuo. The resulting material, a viscous liquid, was tributyl tin S (mercaptoacetic acid). It analyzed 31.36% Sn and 9.35% S.

EXAMPLE XXXVI

Triethyl tin chloride (0.1 mole), mercaptoacetic acid (0.1 mole) and 100 ml. of toluene were admixed. Sodium carbonate (0.05 mole), anhydrous, was added slowly to the stirred solution. Carbon dioxide was evolved. Water of reaction was removed by means of a water trap. The sodium chloride was removed by filtration. The toluene was stripped in vacuo. The resulting viscous liquid was triethyl tin S (mercaptoacetic acid). It analyzed 38.21% Sn and 12.12% S.

EXAMPLE XXXVII

Butyl tin trichloride (0.1 mole), mercaptoacetic acid (0.3 mole) and toluene (100 ml.) were admixed. Sodium carbonate, anhydrous powder (0.15 mole), was added gradually to the stirred solution. Carbon dioxide was evolved. Water of reaction was removed by refluxing with a moisture trap. Sodium chloride was removed by filtration. The toluene was removed in vacuo. The resulting solid was butyl tin S,S,S'' tris(mercaptoacetic acid). It analyzed 20.90% Sn and 17.29% S.

It has also been discovered and is a feature of this invention that the novel organo-tin derivatives of mercapto acids and mercapto acid esters will function as excellent stabilizers for halogen containing resin compositions, particularly vinyl halide resin compositions containing plasticizers, and when intimately dispersed therein, will provide plastic compositions of improved resistance to heat deterioration. Excellent films are obtained from the aforesaid plastic compositions which exhibit a high degree of stability. The optimum concentration of the novel organo-tin derivatives, useful as a stabilizer is between 0.5–10% based on the weight of the vinyl resin. The resin compositions containing this concentration of stabilizer produce a stable and colorless plastic film, which remains clear at elevated temperatures as evidenced by the results of the heat tests in Table I.

Polyvinyl chloride resins and copolymer resins were employed in these tests. The stabilizer was incorporated into a mixture of 100 parts by weight of resin and 35–50 parts by weight of a plasticizer, or a mixture of plasticizers. The weight of the stabilizer was determined by its analysis. Thus enough stabilizer was used to provide the same weight of combined tin as provided by two parts of dibutyl-tin S,S' bis(nonyl mercaptoacetate) (0.374 part of tin by weight). This was done in order to have a means of determining the relative merits of the various compounds.

The mixture was then milled for 5 minutes on a two-roll differential speed mill heated to 320 to 325° F., and removed as a sheet. Portions of the sheet were then placed in a single cavity mold (6" by 6" by 40 mils), and preheated to 275° F. The mold was placed on a Preco press and raised to 320° F. under 10,000 pounds total pressure. When the mold reached 320° F. the pressure was increased to 40,000 pounds and held until the temperature reached 330° F. This procedure required five to five and one-half minutes. The mold and press platens were then cooled and the pressed sheet removed.

The pressed sheet was cut into one inch by six-inch strips and these placed in clips on a tray so that the strips would hang vertically. The tray was then placed in a circulating air oven held at 320° F. Samples were recovered after one hour, two hours, three hours, and four hours of heat aging. Samples were rated visually, the degree of stability of the vinyl resin film being represented by the depth of the colorations, wherein C is colorless, VSY is very slight, yellowing, SY is slight yellowing, Y is yellowed, OY is orange yellow, "rbr" is reddish brown, "br" is brown, and "bl" is black.

TABLE I

| Stabilizer | Composition | | Appearance After Heat Aging | | | |
|---|---|---|---|---|---|---|
| | 100 parts resin | Plasticizer | 1 hr. | 2 hrs. | 3 hrs. | 4 hrs. |
| none | Geon 101 | 50 parts Flexol DOP | rbr | bl | | |
| dibutyl tin dilaurate | 2 parts/100 parts Geon 101 resin | do | Y | rbr | bl | |
| from Ex. 1 | Geon 101 EP (from B. F. Goodrich Co.; polyvinyl chloride resin, homopolymer). | 50 parts Flexol DOP (Dioctyl phthalate). | C | C | C | VSY. |
| from Ex. 2 | do | do | C | C | C | VSY. |
| from Ex. 3 | do | do | C | C | C | VSY. |
| from Ex. 5 | Geon 101-polyvinyl chloride, resin, homopolymer particle size: 100% through 42 mesh screen; specific gravity 1.41; average acetone extract 13%; average specific viscosity 0.55 (at 20° C. of 0.4% solution in nitro-benzene). | do | stable (grey). | stable (grey). | stable (grey). | stable (grey). |
| from Ex. 4 | Geon 101 EP | do | C | C | C | VSY. |
| from Ex. 5 | Geon 101 | do | stable (grey). | stable (grey). | stable (grey). | stable (grey). |
| Do | Geon 101 EP | do | C | C | C | VSY. |
| from Ex. 6 | Geon 101 | do | stable (grey). | stable (grey). | stable (grey). | stable (grey). |
| Do | Geon 101 EP | do | C | C | C | VSY. |
| from Ex. 7 | do | do | C | C | C | VSY. |
| from Ex. 8 | Ultron 300 (Monsanto Chemical Co., polyvinyl chloride resin). | do | C | C | C | VSY. |
| from Ex. 10 | do | do | C | C | C | VSY. |
| from Ex. 11 | do | do | C | VSY | rbr | rbr. |

TABLE I—Continued

| Composition | | | Appearance After Heat Aging | | | |
|---|---|---|---|---|---|---|
| Stabilizer | 100 parts resin | Plasticizer | 1 hr. | 2 hrs. | 3 hrs. | 4 hrs. |
| 2 parts dibutyl tin S,S' bis(nonyl mercapto-acetate). | Ultron 300 | 40 parts Flexol DOP, 10 parts S-140 (cresyl diphenyl phosphate—Monsanto). | C | C | C | VSY. |
| Do | do | 30 parts DOP, 20 parts S-140 | C | C | VSY | SY. |
| Do | do | 20 parts DOP, 30 parts S-140 | C | C | VSY | SY. |
| Do | do | 10 parts DOP, 40 parts S-140 | C | C | SY | Y. |
| Do | Geon 101 EP (polyvinyl chloride resin, homopolymer). | 40 parts DOP, 10 parts Lindol (tricresyl phosphate, Celanese Corp. of Am.). | C | C | C | C. |
| Do | do | 30 parts DOP, 20 parts Lindol | C | C | VSY | VSY. |
| Do | do | 20 parts DOP, 30 parts Lindol | C | C | VSY | VSY. |
| Do | do | 10 parts DOP, 40 parts Lindol | C | C | VSY | VSY. |
| Do | do | 40 parts DOP, 10 parts S-141 (an aryl alkyl phosphate—Monsanto). | C | C | C | C. |
| Do | do | 30 parts DOP, 20 parts S-141 | C | C | C | VSY. |
| Do | do | 20 parts DOP, 30 parts S-141 | C | C | C | VSY. |
| Do | do | 10 parts DOP, 40 parts S-141 | C | C | VSY | SY. |
| 2.2 parts dibutyl tin, S,S' bis(nonyl mercapto-acetate). | Geon 202 (polyvinyl chloride-polyvinylidene chloride copolymer resin, B. F. Goodrich Co.). | 40 parts DOP | C | C | C | C. |
| Do | VR-10 (Naugatuck Chem. Co.) | 35 parts DOP | C | C | C | C. |
| Do | Pliovic A (polyvinyl chloride resin, Goodyear Tire & Rubber Co.). | do | VSY | VSY | SY | Y. |
| Do | U-300 | 35 parts DOP, 15 parts S-141 | C | C | C | VSY. |
| Do | Geon 101 | 50 parts DOP | light grey. | light grey. | light grey. | light grey. |
| Do | U-300 | do | C | C | C | C. |
| Do | QYNA (polyvinyl chloride-polyvinyl acetate copolymer, Bakelite). | do | C | VSY | SY | Y. |
| 2 parts dibutyl tin dilaurate. | Geon 101 | 20 parts DOP, 20 parts S-141 | Y | OY | | |
| Do | do | 37.5 parts DOP, 12.5 parts S-141 | Y | OY | rbr | |
| 2 parts dibutyl tin maleate. | do | do | O | VSY | rbr | |
| 2 parts dibutyl tin dilaurate. | do | 20 parts DOP, 20 parts Lindol | OY | rbr | | |
| 1.35 parts Ex. 34 | do | 50 parts DOP | C | VSY | SY | SY. |
| 1.2 parts Ex. 35 | Ultron 300 | do | Lt. tan | Tan | Tan | br. |
| 0.45 part Ex. 36 | do | do | Y | Y | Tan | br. |
| 1.8 parts Ex. 37 | do | do | Lt. tan | Tan | Dark tan. | br. |

This table clearly discloses the unusual stabilizing activity of the novel mercapto-acid ester derivatives of organo-tin compounds in comparison to a resin without a stabilizer and with known stabilizers. A colorless film evidences the highest degree of stability. This superior stabilizing effect is particularly evident in polyvinyl chloride resin compositions containing phosphate-type plasticizers, the use of which has heretofore been limited due to their instability. The novel organo-tin compounds of the present invention impart sufficient stabilization to such compositions to permit making stable fireproof plastic articles therefrom.

In order to test the effectiveness of the compounds of this invention as light stabilizers, films of 5 mil thickness were prepared by the same methods described above. In each case dibutyltin S,S' bis(nonyl mercaptoacetate) was used as a stabilizer. These films were exposed in an Atlas Electric Devices Company Fadeometer FDA-2 and examined daily until failure occurred. The compositions of the films, the time at which failure was first noted and the type of failure are given in Table II. Type of failure is indicated by a code in which A represents sweating, B specking or spotting, S stiffening and E embrittlement. It should be noted that up to 1000 hours no stiffening or embrittlement had occurred.

TABLE II

| film composition | | fading, hours | type of failure |
|---|---|---|---|
| resin | plasticizer | | |
| 100 parts polyvinyl chloride resin (Geon 101 EP) | 40 parts of dioctyl phthalate (DOP), 10 parts of an aryl alkyl phosphate (S-141). | 500–1,000 | A |
| Do | 30 parts DOP, 20 parts S-141 | 440 / 820 / 1,000 | A / AB / AB |
| Do | 20 parts DOP, 30 parts S-141 | 440 / 820 / 1,000 | A / AB / AB |
| Do | 10 parts DOP, 40 parts S-141 | 440 / 670 / 1,000 | A / AB / AB |
| 100 parts polyvinyl chloride resin (U-300) | 35 parts DOP, 15 parts S-141, 1 part dibutyltin S,S' bis(nonyl mercaptoacetate). | 500 / 700 / 1,000 | A / AB / AB |
| Do | 25 parts DOP, 25 parts S-141, 1 part dibutyltin S,S' bis(nonyl mercaptoacetate). | 500 / 700 / 1,000 | A / AB / AB |
| Do | 15 parts DOP, 35 parts S-141, 1 part dibutyltin S,S' bis(nonyl mercaptoacetate). | 520 / 700 / 1,000 | A / AB / AB |

Other uses of the organo-tin-mercaptoacid and mercapto acid ester derivatives are as stabilizers for other chlorinated materials, as rubber accelerators, rubber antioxidants, lube oil additives and polymerization accelerators.

While the invention has been described with reference to various examples and embodiments, it will be apparent to those skilled in the art that various modifications may be made, and equivalents substituted therefor, without departing from the principles and true nature of the present invention.

Having described the invention, what is desired to be secured by Letters Patent is:

As a composition of matter a homopolymeric resin of vinyl chloride stabilized with 1.8 parts by weight of butyl tin S,S',S" tris(mercaptoacetic acid) per 100 parts of said homopolymeric resin.

References Cited in the file of this patent

UNITED STATES PATENTS

| | | |
|---|---|---|
| 2,648,650 | Weinberg et al. | Aug. 11, 1953 |
| 2,713,585 | Best | July 19, 1955 |
| 2,726,254 | Leistner et al. | Dec. 6, 1955 |
| 2,731,484 | Best | Jan. 17, 1956 |